US008887850B2

(12) United States Patent
Schaefer et al.

(10) Patent No.: US 8,887,850 B2
(45) Date of Patent: Nov. 18, 2014

(54) COVER DEVICE

(75) Inventors: Thilo Schaefer, Gross-Gerau (DE); Serkan Imeci, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/600,446

(22) Filed: Aug. 31, 2012

(65) Prior Publication Data

US 2013/0057013 A1 Mar. 7, 2013

(30) Foreign Application Priority Data

Sep. 3, 2011 (DE) .......................... 10 2011 112 388

(51) Int. Cl.
*F02B 77/11* (2006.01)
*F02B 77/13* (2006.01)
*B60R 13/08* (2006.01)

(52) U.S. Cl.
CPC ................. *B60R 13/08* (2013.01); *F02B 77/13* (2013.01); *F02B 77/11* (2013.01); *B60R 13/0838* (2013.01)
USPC ................. 180/69.22; 180/69.23; 123/195 E; 296/39.3; 296/193.09

(58) Field of Classification Search
CPC ..................................................... F02B 77/13
USPC .............. 123/195 A, 195 C, 198 E; 296/39.3, 296/203.02, 193.09, 192; 180/69.22, 69.23
See application file for complete search history.

(56) References Cited

U.S. PATENT DOCUMENTS

| 6,767,050 | B2 | 7/2004 | Junker et al. |
| 7,305,962 | B2 | 12/2007 | Nonogaki et al. |
| 8,311,701 | B2 * | 11/2012 | Iwai et al. ........................ 701/36 |
| 2004/0200649 | A1 * | 10/2004 | Yatsuda et al. ............... 180/69.2 |
| 2009/0173310 | A1 | 7/2009 | Sedlar et al. |

FOREIGN PATENT DOCUMENTS

| DE | 19543355 A1 | 5/1997 |
| DE | 102004007602 A1 | 9/2005 |
| EP | 1923271 A1 | 5/2008 |
| GB | 2494261 A | 3/2013 |
| JP | 2004132219 A | 4/2004 |
| WO | 2009003302 A1 | 1/2009 |

OTHER PUBLICATIONS

German Patent Office, German Search Report for Application No. 102011112388.5, dated Jun. 21, 2012.

* cited by examiner

*Primary Examiner* — Jeffrey J Restifo
*Assistant Examiner* — Erez Gurari
(74) *Attorney, Agent, or Firm* — Ingrassia Fisher & Lorenz, P.C.

(57) ABSTRACT

A cover device is provided for an engine compartment of a motor vehicle, with at least one, in particular extensive, attenuator, at least a first section of which rests and/or abuts against at least one first engine compartment element situated in the engine compartment, and with at least one fastener, with which the attenuator can be secured or is secured directly or indirectly to the vehicle body, the at least one engine compartment element and/or at least one second engine compartment element situated in or on the engine compartment, in particular in a movable manner.

19 Claims, 1 Drawing Sheet

COVER DEVICE

CROSS-REFERENCE TO RELATED APPLICATION

This application claims priority to German Patent Application No. 10 2011 112 388.5, filed Sep. 3, 2011, which is incorporated herein by reference in its entirety.

TECHNICAL FIELD

The technical field relates to a cover device for the engine compartment of a motor vehicle, as well as to an attenuator for such a cover device.

BACKGROUND

Cover devices are known in the form of sound-absorbing attenuators, for example which are arranged in an engine compartment to reduce engine noise. Known from DE 10 2004 007 602 A2 is a cover device in which a self-supporting attenuator spans the internal combustion engine, and is secured to the lateral edges of the engine compartment by a frame.

It has here proven disadvantageous that a frame must be provided for securing the attenuator, in particular that a frame can as a rule only be used for one vehicle model, which limits the applicability of the cover device. It has further proven inexpedient that the cover device or frame must be detached from the lateral edges to perform maintenance work in the engine compartment, which is time-consuming and inconvenient.

In view of the foregoing, at least one object is to propose a cover device that can be easily arranged in and again removed from the engine compartment of a motor vehicle, as well as manufactured cost effectively. In addition, other objects, desirable features and characteristics will become apparent from the subsequent summary and detailed description, and the appended claims, taken in conjunction with the accompanying drawings and this background.

SUMMARY

A cover device is provided for an engine compartment of a motor vehicle, with at least one, in particular extensive, attenuator, at least a first section of which rests and/or abuts against at least one first engine compartment element situated in the engine compartment, and with at least one fastener, with which the attenuator can be secured or is secured directly or indirectly to the vehicle body, the at least one engine compartment element and/or at least one second engine compartment element situated in or on the engine compartment, in particular in a movable manner. Because the attenuator can be moveably secured by the at least one fastener on the one hand, and abuts with its first section against the first engine compartment element, the attenuator can simply be moved during maintenance work in the engine compartment.

The fastener can be designed in such a way as to be secured to both the vehicle body and on the first engine compartment element and second engine compartment element. As a consequence, the fastener can be used in a plurality of different vehicle models, thereby increasing the applicability. The attenuator can basically be designed as desired, for example to absorb sound. In addition, the attenuator can comprise a thermal shield/heat shield, for example a barrier between the first engine compartment element and/or the second engine compartment element and an internal combustion engine. It is further conceivable that the attenuator optically cover engine compartment elements, so as to enhance the visual appeal of the engine compartment. To this end, appliqués can be placed on the attenuator, for example a manufacturer emblem or the like.

Depending on whether the attenuator is arranged on the vehicle body, the first engine compartment element and/or the second engine compartment element, the attenuator situated in the engine compartment can exhibit its longest extension in the traveling direction of the motor vehicle or transverse thereto.

It proves advantageous for the at least one attenuator to be detachably or fixedly securable or secured by means of the at least one fastener to the vehicle body, the first engine compartment element and/or a second engine compartment element situated in or on the engine compartment, in particular in a movable manner. If the fastener is detachably arranged on the vehicle body, the first engine compartment element and/or the second engine compartment element, it can easily be removed from the engine compartment, or situated on another engine compartment element.

The fastener preferably encompasses a clip or tongue-and-groove connection. However, it is also conceivable for the at least one fastener to encompass a Velcro, screw, or similar detachable connection. The fastener can fix the attenuator in place with respect to its position and alignment. However, it makes sense for the at least one fastener to form a bearing, in particular a pivot bearing, for the at least one cover device, around whose rotational axis the at least one attenuator can pivot.

The progression of the rotational axis can basically be as desired, and depends among other things on what engine compartment element the cover device is situated upon. If the attenuator exhibits its greatest extension in the direction of the width of the motor vehicle, it proves beneficial for the rotational axis to run essentially transverse to the traveling direction and in the direction of the motor vehicle width. In such a case, it proves expedient for the at least one fastener to be arranged on one of the longitudinal sides of the attenuator.

It is conceivable for the attenuator to end at the first section where it abuts against the first engine compartment element. In such a case, it is designed as a cover. In addition, the attenuator can encompass an area of weakened material stretching in particular from a lateral edge of the attenuator to an opposing lateral edge, which allows the attenuator to bend and/or fold at least transverse to the area of weakened material.

The area of weakened material allows the attenuator to bend around the area of weakened material. The remaining areas can also be resilient or stiff in design. In addition, it is conceivable to provide several areas of weakened material. In such a case, the attenuator resembles a lamella, and can bend in several locations.

The at least one area of material weakness can stretch over the attenuator however desired. In one expedient embodiment, the at least one area of weakened material can essentially run parallel to the rotational axis of the at least one fastener. However, it is also conceivable, in particular when several areas of weakened material are provided, for the several areas of weakened material to run transverse or inclined relative to each other, which further improves the ability to apply the attenuator to an engine compartment element.

Another embodiment provides that at least one attenuator be flexibly bendable at least transverse to the rotational axis. In such a case, the attenuator is designed to resemble a curtain. The at least one attenuator can further cover the engine compartment as a whole or at least partially. If the attenuator covers the entire engine compartment, the capability of the cover device to absorb sound is at its greatest.

If the cover device partially covers the engine compartment, individual engine compartment elements, for example which represent sound emission sources, can be separately covered. It is basically conceivable to only provide a single fastener to fix the attenuator in place. However, it proves advantageous for the cover device to encompass at least two fasteners, with which the attenuator can be directly or indirectly securable or secured to the vehicle body, the at least one first engine compartment element and/or at least one second engine compartment element situated in or on the engine compartment, in particular in a movable manner, and/or wherein the at least two fasteners each form a bearing, and in particular the rotational axes of the at least two fasteners are arranged parallel to each other. This enhances the stability with which the cover device is arranged in the engine compartment.

It proves advantageous for the cover device to encompass at least two spaced apart attenuators that adjoin or overlap one another, in particular along and/or parallel to the rotational axis. In addition, it is conceivable that both attenuators be situated transverse or inclined relative to their rotational axis. It further proves expedient for the at least one first engine compartment element to encompass a drive unit, in particular an internal combustion engine, and/or the at least one second engine compartment element to encompass an area of a water channel on the front wall.

The attenuator can basically be designed as desired. However, it has proven advantageous for the attenuator to encompass a high-expansion foam, in particular one coated with film, a plastic and/or a non-woven fabric. This makes it cost-effective to manufacture, and allows its use for various applications (e.g., acoustics, engine compartment design). Finally, it is advantageous that the attenuator be fire- and/or heat-resistant. In such a case, it can abut against the internal combustion engine without any problem.

In addition, an attenuator is provided for a cover device that encompasses at least one of the aforementioned features. The cover device, as well as the attenuator, both proves advantageous in a variety of ways. Because the cover device is detachably secured, it can be removed, for example to perform maintenance work on an engine compartment element. The movable attachment further makes it possible to only change the position of the cover device, for example to perform maintenance work, which reduces the time expenditure. In addition, the at least one area of weakened material and/or flexibly bendable configuration of the attenuator makes it possible to easily abut the attenuator against at least one engine compartment element.

BRIEF DESCRIPTION OF THE DRAWINGS

The detailed description will hereinafter be presented in conjunction with the following drawing figures, wherein like numerals denote like elements, and.

DETAILED DESCRIPTION

Figure 1:
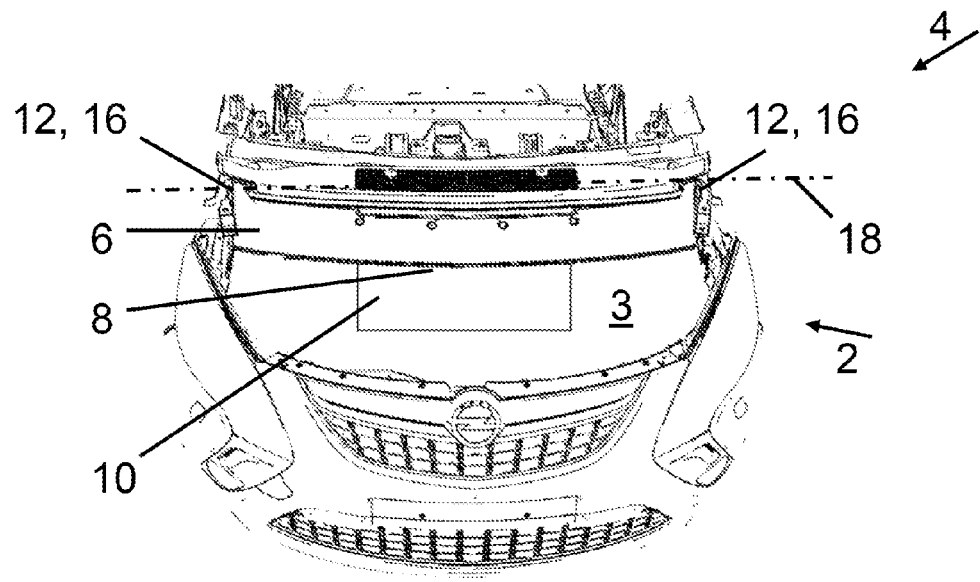
FIG. 1 is a schematic top view of a first exemplary embodiment of the cover device.

The following detailed description is merely exemplary in nature and is not intended to limit application and uses. Furthermore, there is no intention to be bound by any theory presented in the preceding background or summary or the following detailed description.

The drawing shows a cover device marked as a whole with reference number 2 for the engine compartment 3 of a motor vehicle 4. The cover device 2 exhibits an extensive attenuator 6, a first section 8 of which abuts against a first engine compartment element 10 situated in the engine compartment 3. The side of the attenuator 6 lying opposite the first section 8 is provided with two fasteners 12, with which the attenuator 6 is secured in a movable manner to a second engine compartment element 14 situated in the engine compartment 3.

In the embodiment shown on the figures, the attenuator 6 is detachably clipped to the second engine compartment element 14 by the fasteners 12. The fasteners 12 here each comprise pivot bearings 16 for the cover device 2, which allow the attenuator 6 to pivot around its rotational axis 18. The rotational axis 18 runs in the direction of the width of the motor vehicle.

Figure 2:
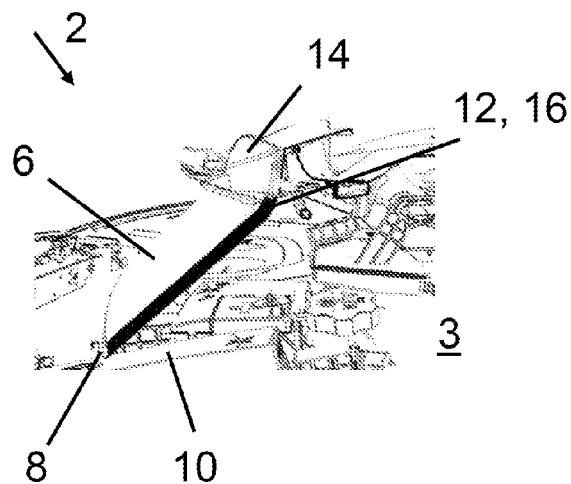
FIG. 2 is a side view of the exemplary embodiment according to FIG. 1.
Figure 3:
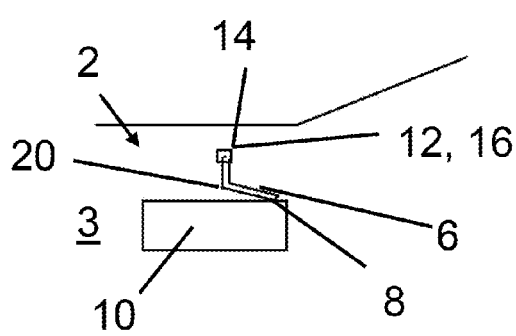
FIG. 3 is a side view of a second exemplary embodiment of the cover device.

FIG. 1 and FIG. 2 show a first embodiment of the cover device 2, in which the attenuator 6 is stiff, and its first section 8 abuts against the first engine compartment element 10. FIG. 3 shows a second exemplary embodiment of the cover device 2, in which the attenuator 6 encompasses an area of weakened material 20, which makes it possible to bend the attenuator 6 transverse to the area of weakened material 20. In the exemplary embodiment shown on FIG. 3, the area of weakened material 20 essentially runs parallel to the rotational axis 18 of the two fasteners 12. The regions between the areas of weakened material 20 are essentially stiff As evident from the figures, the attenuator 6 of the cover device 2 only partially covers the engine compartment 3. In the embodiments shown, the first engine compartment element 10 involves an internal combustion engine, and the second engine compartment element 14 involves an area of a water channel on the front wall.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A cover device for an engine compartment of a motor vehicle, comprising:
   an attenuator having a first section that rests against a first engine compartment element situated in the engine compartment; and
   a fastener that is configured to at least indirectly secure the attenuator in a movable manner to at least one of a body of the motor vehicle, the first engine compartment element, and a second engine compartment element;
   wherein the fastener is configured to form a bearing around a rotational axis about which the attenuator is configured to pivot; and
   wherein the attenuator comprises an area of weakened material that stretches from a lateral edge of the attenuator to an opposing lateral edge, which allows the attenuator to bend at least transverse to the area of weakened material.

2. The cover device according to claim 1, wherein the attenuator is configured to at least partially cover the engine compartment.

3. The cover device according to claim 1, wherein the attenuator is further defined as at least two spaced apart attenuators that adjoin along the rotational axis.

4. The cover device according to claim 1, wherein the first engine compartment element comprises a drive unit.

5. The cover device according to claim 1, wherein the second engine compartment element comprises an area of a water channel on a front wall.

6. A cover device for an engine compartment of a motor vehicle, comprising:
- an attenuator having a first section that rests against a first engine compartment element situated in the engine compartment; and
- a fastener that is configured to at least indirectly secure the attenuator in a movable manner to at least one of a body of the motor vehicle, the first engine compartment element, and a second engine compartment element;
- wherein the fastener is configured to form a bearing around a rotational axis about which the attenuator is configured to pivot; and
- wherein the attenuator is flexibly bendable at least transverse to the rotational axis.

7. The cover device according to claim 6, wherein the attenuator comprises an area of weakened material that stretches from a lateral edge of the attenuator to an opposing lateral edge, which allows the attenuator to bend at least transverse to the area of weakened material.

8. The cover device according to claim 7, wherein the area of weakened material is configured to essentially run parallel to the rotational axis of the fastener.

9. The cover device according to claim 6, wherein the area of weakened material is configured to essentially run parallel to the rotational axis of the fastener.

10. The cover device according to claim 6, wherein the attenuator is configured to at least partially cover the engine compartment.

11. The cover device according to claim 6, wherein the attenuator is further defined as at least two spaced apart attenuators that adjoin along the rotational axis.

12. The cover device according to claim 6, wherein the first engine compartment element comprises a drive unit.

13. The cover device according to claim 6, wherein the second engine compartment element comprises an area of a water channel on a front wall.

14. A cover device for an engine compartment of a motor vehicle, comprising:
- an attenuator configured to absorb sound and having a first section that rests against a first engine compartment element situated in the engine compartment; and
- a fastener that is configured to at least indirectly secure the attenuator in a movable manner to any of a body of the motor vehicle, the first engine compartment element, and a second engine compartment element;
- wherein the fastener is configured to form a bearing around a rotational axis about which the attenuator is configured to pivot; and
- wherein the attenuator is further defined as at least two spaced apart attenuators that adjoin along the rotational axis.

15. The cover device according to claim 14, wherein the attenuator comprises an area of weakened material that stretches from a lateral edge of the attenuator to an opposing lateral edge, which allows the attenuator to bend at least transverse to the area of weakened material.

16. The cover device according to claim 15, wherein the area of weakened material is configured to essentially run parallel to the rotational axis of the fastener.

17. The cover device according to claim 14, wherein the attenuator is configured to at least partially cover the engine compartment.

18. The cover device according to claim 14, wherein the first engine compartment element comprises a drive unit.

19. The cover device according to claim 14, wherein the second engine compartment element comprises an area of a water channel on a front wall.

* * * * *